UNITED STATES PATENT OFFICE.

ROBERT GNEHM, OF BASLE, SWITZERLAND, ASSIGNOR TO THE SOCIETY OF CHEMICAL INDUSTRY, OF SAME PLACE.

RED DYE.

SPECIFICATION forming part of Letters Patent No. 425,504, dated April 15, 1890.

Application filed December 17, 1889. Serial No. 334,053. (Specimens.)

*To all whom it may concern:*

Be it known that I, ROBERT GNEHM, a citizen of Switzerland, residing at Basle, Switzerland, have invented new and useful improvements in the production of a coloring-matter by the action of succinic acid upon dimethyl-meta-amidophenol, of which the following is a specification.

In carrying out my invention I proceed as follows: A mixture of fifteen kilograms of succinic acid anhydride and of ten kilograms of chloride of zinc is heated up to 190° centigrade, and then ten kilograms of dimethyl-meta-amidophenol are added. The temperature shall in no case exceed 210° centigrade. After about fifteen minutes the mass begins to thicken and the reaction is finished. The molten mass is pulverized and then dissolved by heating it in two hundred kilograms of water and twenty kilograms of muriatic acid. After cooling the coloring-matter separates out in crystalline needles of a dark-green color. These needles are filtered out, and for complete purification they are dissolved in three hundred kilograms of hot water and five kilograms of concentrated muriatic acid. This solution is filtered again, five kilograms of muriatic acid added to it, and the whole left alone for crystallization. The hydrochloride of the coloring-matter separates out in crystalline needles of about one centimeter length and of a glistening green color. It is soluble in water and in alcohol. The alcoholic solution as well as the dyed silk show a decidedly yellow fluorescence.

The product obtained in the manner herein described dyes a brilliant red with yellow fluorescence on wool, silk, and mordanted cotton. The shade is not so blue as that of the red carbon color obtained by the action of succinic acid upon diethyl-meta-amidophenol, which was the subject of my patent, No. 402,436, dated April 30, 1889. The shade is more beautiful and more appreciated.

What I claim as new, and desire to secure by Letters Patent, is—

The red coloring-matter obtained from succinic acid and dimethyl-meta-amidophenol, the hydrochloride of which separates in long crystalline needles of a glistening green color, soluble in water and alcohol, and dyeing wool, silk, and mordanted cotton a brilliant red with yellow fluorescence.

In testimony whereof I have hereunto set my hand in the presence of two subscribing witnesses.

ROBERT GNEHM.

Witnesses:
GEORGE GIFFORD,
CHS. A. RICHTER.